United States Patent Office 3,514,608
Patented May 26, 1970

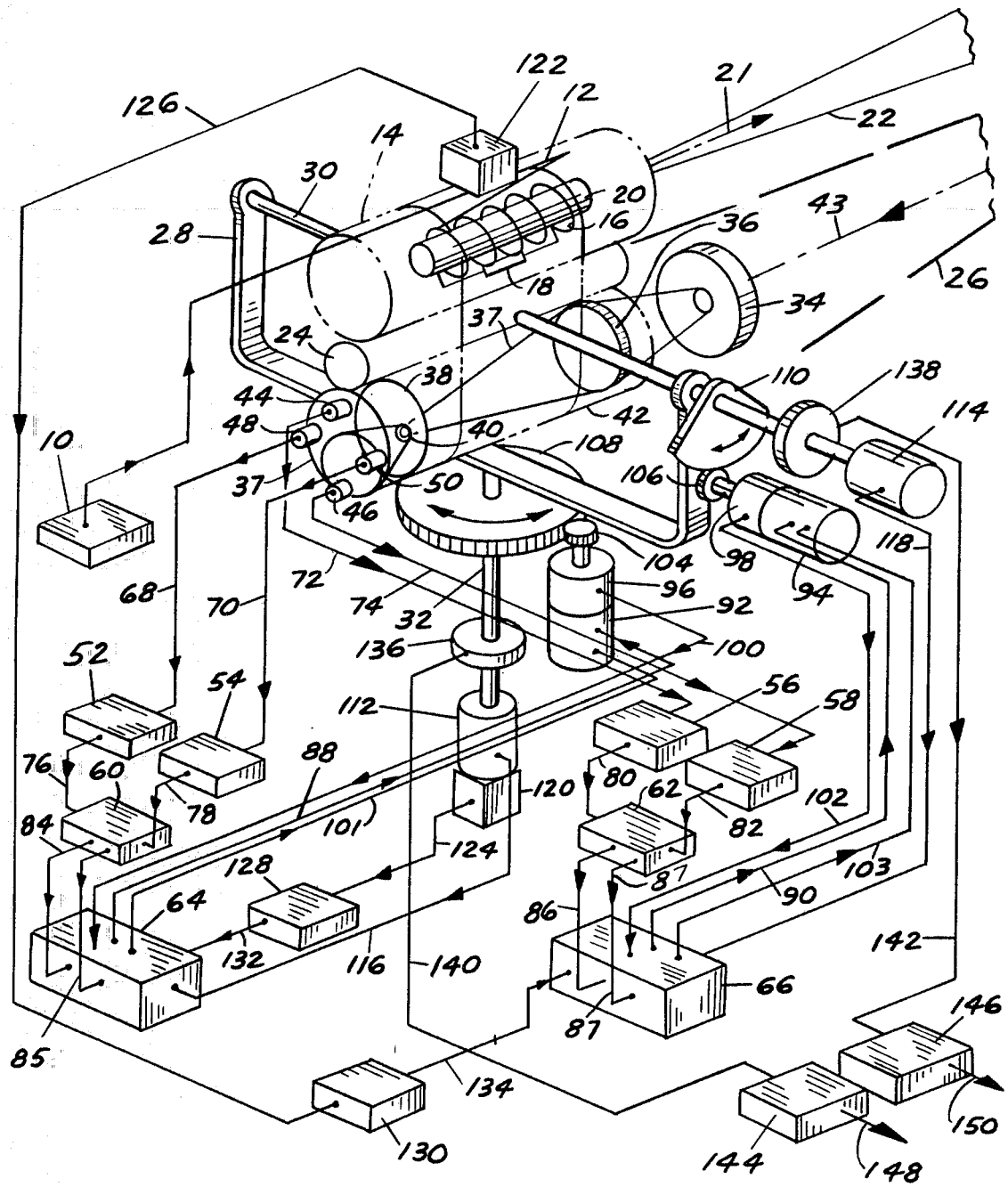

3,514,608
LASER ERRORED AZIMUTH-ELEVATION SERVO LOCKON TRACKING SYSTEM
Lloyd A. Whetter, Ferndale, Mich., assignor to the United States of America as represented by the Secretary of the Army
Filed Sept. 8, 1967, Ser. No. 667,330
Int. Cl. G01c 3/08; G01j 1/20
U.S. Cl. 250—203         7 Claims

ABSTRACT OF THE DISCLOSURE

A system for tracking a moving object utilizing a laser beam which is caused to follow the target by means of a servomechanism which is responsive to the output of detectors which convert the return light beam into electrical signals. The servomechanism operates on a nulling principle such that the servo will cause the system to turn until the beam is on target when the system will balance and be in the null condition.

The invention described herein may be manufactured and used by or for the Government of the United States of America without the payment to me of any royalty thereon or therefor.

The present invention relates to the use of laser (Light Amplification by Stimulated Emission of Radiation) beamed energy as a target tracker. More particularly, the invention applies the laser technology to a lockon system for detecting and tracking vehicles.

In many military operations, it is important to be able to detect the location, proximity, and movement of vehicles and objects which are not visible to the naked eye due to nocturnal and meteorological conditions, or other adverse circumstances. Apparatus has been designed, developed and operated in the past which operated by means of ultrahigh frequency radio waves reflected from the object and received, observed and analyzed in such a way that the location of the object may be determined. Such apparatus has many obvious disadvantages including large, bulky, and expensive equipment and limited accuracy due to the large beam width peculiar to those systems.

These conventional systems have the disadvantage of giving false information because cloud cover or other objects which are in close proximity also reflect the transmitted energy pulse. It has been found that the laser beam can be focused to a very narrow beam and hence vastly improve accuracy because of the improved discrimination over most modern radar systems. This improved discrimination due to the narrow width permits the tracking of a single target which is very small, a feat which prior to this time could not be accomplished.

By the present invention a coherent light source is utilized to track a moving object with much higher accuracy than has been previously known. The general object of the invention, therefore, is to utilize laser technology as a means for automatically tracking a target.

Another object of the invention is to provide a new and improved tracking system of the general type set forth utilizing a coherent light generator which avoids the above mentioned difficulties.

It is still another object of the invention to provide for a tracking system of the type mentioned in which the control signals for the system are generated by energy cells which convert the reflected laser beam into electrical signals dependent upon the direction of the beam with respect to the target.

Yet another object of this invention is the provision of a tracking system of the above type in which the lockon feature of the system is provided for by a servo system which operates on the concept of the equal balance or null of the return signals.

Other objects and advantages of the present invention will be obvious to those skilled in the art by the following description when considered in relation to the accompanying drawing of which;

The single figure of the drawing is a schematic of a preferred form of the laser transmitting, receiving, detecting and control apparatus embodying my invention.

Referring now to the drawing, the laser transmitting source consists generally of an elliptical cylinder 14 (shown in phantom), laser material 20, flashing equipment 10, trigger electrode 12, flash tube 16, and a charging source 18. The laser is a device which produces coherent light, that is, the radiation is at a single frequency, it is completely in-phase and is in the same plane of polarization. The basic laser device consists of some laser material, a pumping source of the proper energy or color and a means for coupling the pump energy into the laser material. Basically, laser devices are rather simple mechanically and their theory of operation is well known. The cylinder, generally shown at 14, has a highly polished reflector adhering to the inside of the cylinder for efficient radiation of the emitted light. The laser material 20 may be centrally fixed within the cylinder by any conventional mechanical means on the longitudinal axis 21 of the transmitting source.

Surrounding material 20 in the pulse type laser is shown a helical flash tube 16, which may be of the conventional type which is filled with xenon. The xenon-filled flash tube is shown as being connected to a charging source 18. The pumping or flashing source 10 which is utilized to initiate the laser is shown as being connected to trigger electrode 12. The flashing source may include any conventional pulse forming network necessary to shape the dumping energy of the laser rod. An example of such a network may simply be a capacitor changing circuit which is periodically discharged through a transformer. The rate at which the capacitor is discharged determines the rate at which the device will emit bursts of coherent light as shown at 22 in drawing. Variations in the concept can employ a continuous wave laser or a gallium arsenide diode injection laser which is battery operated for a continuous output beam or fed from a modulated source input for an interrupted beam.

The laser receiving apparatus consists generally of laser receiving telescope 42, red light pass filter 34, lens 36, diaphragm 38, and detectors 44, 46, 48 and 50. The transmitting apparatus 14, receiving apparatus 42, and sighting telescope 24 may be suitably mounted in any appropriate fashion on support beam member 28 and shafts 30 and 32 which are connected thereto. The axes 21 and 43 of the transmitting source 14 and receiving apparatus 42 should be slightly convergent in the same vertical plane. Sighting telescope 24 may be used in boresighting the telescope line of sight to the laser rod line of sight at the middle range of operation of the system. Since the return laser beam 26 may be a different color than output beam 22 due to the nature of the target, an extraneous source of light, or the sun, a red light pass filter 34 is provided. Filter 34 will pass only light which is approximately in the same portion of the light spectrum as output beam 22. Sighting telescope 24 may also be used to optically acquire the target, or if desired, an automatic scan system could be employed. As seen from the drawing, sighting telescope 24 is conveniently located intermediate the transmitting and receiving apparatus.

Lens 36 focuses the filtered light through aperture 40 in diaphragm 38 so that the light rays 37 reach detectors 44, 46, 48, and 50 as if from a point source. The four energy conversion cells or crystals 44, 46, 48 and 50 are made of any suitable material such as indium antiminide and are spaced equiangularly at 90 degree intervals. The cells are fixed in any mechanically suitable manner in a plane which is perpendicular to the axis 43 of the laser receiving telescope. The cells may either be located within the telescope itself or on a separate mounting means (not shown) immediately adjacent the telescope. These cells are further responsive to a particular frequency range and convert the infra red beam to an electrical signal. Hence, the cells detect the amount of energy within a particular frequency range and are selected to have a good response to the ruby light spectrum. If another laser transmitting frequency is used, detectors would be employed that have a good response to that frequency spectrum. The received ray 26 is shown as being unbalanced in both azimuth and elevation.

As shown in the drawing, the return beams 26 and 37 is not dispersed equally on all four detector cells such that cells 46 and 50 received more light than do cells 44 and 48. Since these cells generate a signal proportional to the light received the signal output on line 70 is larger than the signal on line 68 and similarly, the signal output on line 74 is larger than that on line 72. The return beam 26 will not be dispersed equally on all cells until and unless the transmitted beam 21 is centered on the target. The beam is considered to be centered on target whenever the entire transmitting beam strikes the target object. If a portion of the transmitting beam does not strike the target, the return beam will be reflected unevenly in a distorted and off center position such that the detector cells receive uneven amounts of energy as shown. As will be described later, the unbalance of signals on lines 68 and 70 will cause azimuth control servomotor 92 to turn the transmitting source so that the laser beam is centered horizontally on the target and hence cell 50 will receive the same amount of light energy as cell 48. Similarly, the unbalance of signals on lines 72 and 74 will cause vertical control servomotor 94 to turn the transmitting source such that the laser beam is centered vertically and detectors 44 and 46 receive equal amounts of light energy and hence generate balanced signals.

The modulator circuits 52, 54, 56 and 58 are necessary to change the pulse recurrence frequency-low energy pulse return signal to a 400 cycle modulated carrier signal which is used to excite the control windings of the azimuth and elevation control motors 92 and 94 respectively. Incorporated in the modulator circuit is a pulse stretching circuit for increasing the integral of pulse energy to whatever level is required by the servoamplifier. The design of the modulator circuit is such that, the carrier signal is injected only when the conversion cells generate a signal. There will be no carrier signal generated during the listening time which is also referred to as the inter-pulse time. Mixers 60 and 62 are used to combine the modulated signals on lines 76 and 78. These mixers may be of the cross-fed type so that when a signal is detected in the left-hand detector 48, the mixer will cause energy to be fed over to the opposite side as indicated in line 85 and thereby cause the motor 92 to drive the transmitting source and receiving apparatus to the right by energizing the right hand motor control line 101 which connects amplifier 64 and motor 92. Similarly, if energy is detected in right hand cell 50 which is fed down line 78, the mixer sends it to the left hand control line 84 and driving motor 92 via means of line 103 which connects the amplifier 64 and motor 92 so that the motor drives the transmitting source and receiving apparatus to the left.

It is of course possible not to use a cross-fed mixer. If desirable, the mixer could have included a lead type network with dual capacitors feeding a resistor. One of the inputs is inverted to get the phase displacement necessary for subtracting or differencing the signals. This method of mixing causes the signals from the azimuth detectors 48 and 50 to be in phase opposition and similarly to have the signals from the vertical detectors 44 and 46 in phase opposition. Hence, if the signals on each pair of lines 76 and 78 and lines 80 and 82 are of equal magnitude, no signal will be fed to amplifiers 64 and 66 and the motor control windings. As indicated, the particular type of mixer and modulation circuits chosen are many and varied and the particular details of same are not germane to the instant invention. Such circuits may be found in any design or engineering handbooks. Particular types of circuits may be found in Servo Mechanism Practice, Ahrendt (1954), or Electronic Instruments, Greenwood, Holdam and McRae (1948).

The output of mixers 60 and 62 are fed to azimuth and elevation servoamplifiers 64 and 66 respectively via means of leads 84–87. Since the energy conversion cells are not designed to furnish power to drive a load of any significant size, the voltage output must be amplified before it is powerful enough to drive the servomotors. The servoamplifiers are also well known and need not be explained in detail as their construction and operation are well known. Suffice it to say that the servoamplifiers may be either of the magnetic or vacuum tube type or a combination thereof. If the combination type is utilized, the vacuum tube section would amplify the error signal which would in turn control a magnetic amplifier where the power amplification occurs. A suitable servoamplifier may be found on page 486 of Electronic Instruments, Greenwood, Holdam and McRae (1948), or Servo Mechanism Practice, Ahrendt (1954).

Regardless of the type of amplifier used, the outputs of the servoamplifiers 64 and 66 are connected via means of leads 88, 101, 90 and 103 to the control field of the servomotors 92 and 94. Motor 92 controls the horizontal direction of the laser while motor 94 controls the angle of elevation. Motor 92 is connected via suitable shaft means to friction wheels 104 and 108. The surfaces of these wheels are made rough so as to bite as much as possible; one is sometimes faced with leather, or better, with vulcanized india-rubber. Gears or a belt-pulley system could replace the friction wheels if desired. Wheel 108 is fixed to shaft 32 in any suitable manner, such as by a key, which in turn is fastened to mounting bracket 28. Similarly, motor 94 is connected to wheel 106 which frictionally engages wheel section 110. Wheel section 110 is fixed to shaft 30.

As mentioned previously, the laser transmitting and receiving apparatus 14 and 24 are suitably fixed to shaft 30 and mount 28 so that when motor 92 turns the laser moves through a horizontal angle and when motor 94 turns, the laser moves through a vertical angle. Motors 92 and 94 will operate on the 400 cycle modulated signal and hence control will be mainly dependent upon the quantity of 400 cycle signal received. A fixed field may be used which would be energized at all times but which will not turn the motor shaft unaided. The motor control field would be energized when an error voltage appears due to an unbalance of signals from the detectors which cause the motor to operate. The motors will continue to operate until the signals from the detectors are balanced and hence the system is in a null condition. As mentioned previously, the signals are balanced when the laser beam is centered on target.

Attached to shafts 30 and 32 are elevation and azimuth rate control gyros 114 and 112 respectively. These gyros each provide a positional feedback signal dependent upon the velocity at which the servomotors are turning the apparatus. These signals are fed from gyros 114 and 112 to amplifiers 66 and 64 through lines 118 and 116 respectively. An integration circuit may be provided between the gyros and amplifiers if desired. Another feedback signal is provided by azimuth accelerometer 120 and elevation accelerometer 122 which may be mechanically fastened to the laser cavity housing in any suitable manner. Since these devices measure acceleration, it is necessary to send these signals via lines 124 and 126 to double integral networks 128 and 130 respectively where they are converted to displacement signals and sent to amplifiers 64 and 66 via leads 132 and 134. If additional damping is desired, generators 96 and 98 may also be placed on the servomotor shafts of the system to provide feedback signals which are fed to the amplifiers on lines 100 and 102 respectively. The feedback signals are in turn transmitted to the respective servomotors.

The invention herein described is designed primarily for tank and military vehicles which have guns (not shown) or weapons which are aimed at a target. Input circuitry 144 and 146 is used to control the azimuth and elevation servomotors (not shown) which are used to control the position of the guns. Input circuitry 144 and 146 provide signals as shown at 148 and 150 to the azimuth and elevation servomotors depending on the azimuth and elevation error to gun position signal generated by azimuth synchro 136 or elevation synchro 138 via lines 140 and 142, respectively.

The operation of the above described laser beam target tracker can best be understood by the consideration of only the azimuth portion of the system. The elevation portion of the system will operate in a similar fashion. The system is initiated by laser flashing equipment 10. The rate at which flasher 10 is operated determines the rate at which laser crystal 20 will emit a brust of coherent light 22.

These pulses make up the output beam which is aimed at a target through sighting telescope 24. When a target is acquired, the beam will be partially reflected from the target surface as shown at 26, dependent upon the reflectivity coefficient of the target and the transmissibility of the air, for the laser frequency being transmitted. The return beam is then filtered at 34 so that only light of approximately the same frequency as that transmitted passes through and it is then refocussed to an opening 40 which sheds the red light on the four detectors 44, 46, 48 and 50.

The energy conversion cells produce a signal which is proportional to the deviation of the beam from the target center which determines the amount of light energy received by each cell. When the beam is directed such that the entire beam strikes the target, the return beam will strike all detectors with an equal amount of light energy and hence the output signal of all the detectors will be equal. In this condition, the signals in each of the lines 76 and 78 will be equal and opposite and hence no energy will be sent to the servomotors. On the other hand, if the laser beam 22 is not centered on the target, the return beam will be unbalanced. As shown in the drawing, the beam may have an unbalanced condition such that light only shines on two of the four detectors 46 and 50. Any unbalance of the return beam will result in unequal signals from the detectors. The unbalance will modulate a carrier signal which will be amplified and applied to the control windings of the servomotors. The detection and servo system operate on a concept of equal balance or null of the return signals. If the laser is not directly on target and more energy is detected in cell 50 than cell 48, the servomotor 92 will operate until the signals in the two azimuth detectors are equal and hence the system is at a null position and the motor will stop.

Before the system "nulls," the amplifier 64 will receive feedback damping signals from accelerometer 120 which is integrated by double integral network 25 to give a "type O" constant error servo signal, from generator 96, along line 88, and from azimuth rate gyro 112. This will insure that the system does not overshoot the target and prevents the laser head from oscillating. If the target moves, the unbalance condition in the detectors and hence the servomotors will exist and hence the motors will drive the laser head back to a position so that the entire laser beam is on target. Hence, the laser will lock on the target and continue to track it.

If desired, readout information of the beam direction and altitude may be obtained. Also, when the system is nulled to a target, the laser head is rotated to an angle in azimuth and elevation. The angle in azimuth is measured by azimuth synchro 136 and transmitted to input circuitry, azimuth error to gun position servo unit 144. Unit 144 may then in turn transmit signal 148 to position the weapon or gun on the tracked target.

It should further be understood that the use of the invention is not limited to tank and military vehicles though it is primarily designed therefor. Because of the extreme range capability, the laser tracker will operate from conventional winged aircraft or helicopter. It should further be understood that variations in the degree of accuracy could be effected by variations in the focusing of the output laser beam so that it encompasses all less than or more than the entire target. It should also be noted that a zoom lens feature could be incorporated to insure a sufficient illuminating beam in the event the target is at a distance greater than that required for optimum tracking capability. It should be further noted that the system could be designed such that light will focus on the energy conversion cells only when the output laser beam is not centered on the target without departing from the spirit of the invention. Moreover, it is to be understood that any number of conversion cells could be used although only four are shown.

It will be apparent that minor modifications and variations will be apparent to those of ordinary skill in the art and by applying current knowledge readily adapt it for various applications without omitting essential features of the invention. Accordingly, it is intended that such modifications and variations are to be comprehended within the meaning and range of equivalence of the following claims.

What I claim is:

1. A laser errored azimuth-elevation servo lockon system for automatically tracking a moving ground oriented target object comprising a pulse type laser transmitting source for transmitting a beam in the form of bursts of coherent light at said ground oriented moving target which is reflected in a return beam of pulsed coherent light; a laser receiving apparatus including a light pass filter for receiving the return pulsed beam of light and passing only light which is approximately in the same portion of the spectrum as the output beam; two pair of energy conversion cells for converting the return beam of light to an electrical signal; mounting means for holding the transmitting source, receiving apparatus and conversion means in fixed space relation; said electrical signal being fed through modulator circuits changing the signal from said cells to a modulated carrier signal for passage through a crossfeed type mixer circuit and thereby exciting the control windings of servomechanism means; and said servomechanism means attached to the mounting means and being responsive to said crossfeed signal to cause said transmitting source and said receiving apparatus to be moved automatically in the directions in which the target object moves so that the output beam is directed at the target to enable the system to lockon and track the target.

2. The system of claim 1 wherein said transmitting source and receiving apparatus are fixed in spatial relation relative to each other by said mounting means and the axes of said transmitting source and said apparatus are located in the same vertical plane and are slightly convergent.

3. The system of claim 1 wherein said energy conversion cells are equiangularly spaced about a plane which is at right angles to the longitudinal axis of the receiving apparatus.

4. The system of claim 3 having means for electrically connecting the outputs of each pair of said energy conversion cells which are diametrically opposed to servomotors which are used to control the direction of the transmitting beam.

5. The system of claim 4 wherein a first pair of said cells is electrically connected to an azimuth control servomotor and a second pair of said cells is electrically connected to an elevation control servomotor, each cell of said first pair generating equal signals only when the transmitting beam is centered horizontally on the target and each cell of said second pair of said cells generating equal signals only when transmitting beam is centered vertically on the target.

6. The system of claim 5 wherein said azimuth controlled servomotor will drive the transmitting source in the horizontal direction in which the target is moving when the signals from each cell of said first pairs of cells are unequal and said vertical controlled servomotor will drive the transmitting source in the vertical direction in which the target is moving when the signals from each cell of said second pair of cells are unequal.

7. A laser errored azimuth-elevation servo lockon system for automatically tracking a ground vehicle moving target object comprising a pulse type single color laser transmitting source for transmitting bursts of a beam of coherent light at said moving target which is reflected in a return beam of coherent light; a laser receiving apparatus for receiving the return beam of pulsed light and having energy conversion means for converting the return pulsed beam of light to an electrical signal; mounting means for holding the transmitting source, receiving apparatus, and the conversion means in fixed spatial relation; and servomechanism means attached to the mounting means and being responsive to said electrical signal to cause said transmitting source and receiving apparatus to be moved in the direction in which the target object is moving so that the output beam is directed at the target to enable the system to lockon and track the target; said transmitting apparatus comprising an elliptical cylinder in which laser material is centrally located and which is intermittently pulsed by at least one source of electrical energy to produce said output beam comprising bursts of coherent light which is directed at said moving target to cause said return beam of light to be reflected; said laser receiving apparatus being in fixed spaced relation to said transmitting source with the axis of said apparatus and said transmitting source being located in the same vertical plane and slightly convergent; said laser receiving apparatus comprising a red light pass filter which only permits light of the desired frequency to pass; a lens for focusing the filtered light on said energy conversion means; said energy conversion means comprising four energy conversion cells of the indium antiminide crystal type which convert the received coherent light energy into electrical energy; said cells being spaced at equiangular intervals of substantially 90 degrees about a plane which is perpendicular to the axis of the receiving apparatus and producing electrical signals proportional to the amount of light energy received, pairs of said cells which are diametrically opposed having means for electrically connecting their outputs to servomotors, a first pair of said cells providing azimuth control signals for an azimuth controlled servomotor such that when the beam is centered horizontally on the target the signals are balanced; a second pair of said cells providing vertical control signals for an elevation controlled servomotor such that when the beam is centered vertically on the target the signals are balanced; said servomechanism having at least said azimuth controlled and elevation controlled servomotors drivingly connected to said mounting means to control the direction of the laser transmitting source in response to said control signals such that when the signals from said first pair of cells are unbalanced the azimuth controlled servomotor will turn the laser transmitting source in the horizontal direction in which the target moves and when the signals from said second pair of cells are unbalanced the vertical controlled servomotor will drive the laser transmitting source in the vertical direction in which the target moves; said electrical connecting means including modulator circuits changing the signals from said cells to a modulated carrier signal for passage to a crossfeed-type mixer circuit for exciting the control windings of said azimuth and elevation servomotors respectively.

References Cited

UNITED STATES PATENTS

| | | | |
|---|---|---|---|
| 3,290,505 | 12/1966 | Stavis | 250—203 |
| 3,373,401 | 3/1968 | Bayer | 250—203 X |

OTHER REFERENCES

R. F. Lucy et al.: Precision Laser Automatic Tracking System Applied Optics, April 1966/vol. 5, No. 4, pp. 517–523.

T. W. Barnard et al.: Digital Laser Ranging and Tracking System Using a Compound Axis Servo, Applied Optics, April 1966/vol. 5, No. 4, pp. 497–503.

JAMES W. LAWRENCE, Examiner

E. R. LA ROCHE, Assistant Examiner

U.S. Cl. X.R.

250—208, 217; 356—4